Figure 2:
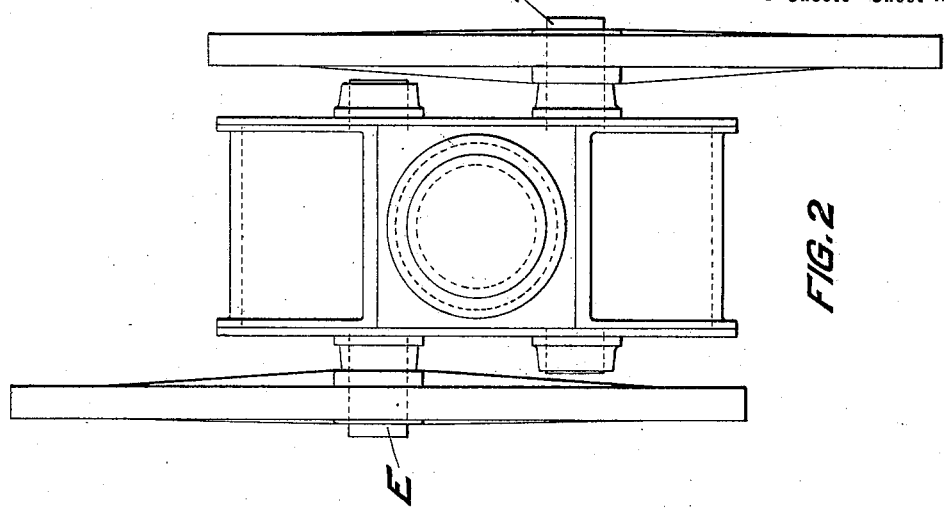

No. 613,769. Patented Nov. 8, 1898.
F. W. LANCHESTER.
FLUID PRESSURE ENGINE.
(Application filed May 10, 1897.)

(No Model.) 3 Sheets—Sheet 1.

Witnesses:
E. B. Bolton
Otto Munk

Inventor:
Frederick William Lanchester
By Richard
his Attorneys.

THE NORRIS PETERS CO., PHOTO-LITHO., WASHINGTON, D. C.

No. 613,769.  
F. W. LANCHESTER.  
FLUID PRESSURE ENGINE.  
(Application filed May 10, 1897.)  
(No Model.)  
Patented Nov. 8, 1898.  
3 Sheets—Sheet 2.

Witnesses:  
E. B. Bolton

Inventor:  
Frederick William Lanchester  
By Richard  
his Attorneys.

No. 613,769. Patented Nov. 8, 1898.
F. W. LANCHESTER.
FLUID PRESSURE ENGINE.
(Application filed May 10, 1897.)
(No Model.) 3 Sheets—Sheet 3.

United States Patent Office.

FREDERICK WILLIAM LANCHESTER, OF ALVECHURCH, ENGLAND.

FLUID-PRESSURE ENGINE.

SPECIFICATION forming part of Letters Patent No. 613,769, dated November 8, 1898.

Application filed May 10, 1897. Serial No. 635,937. (No model.)

*To all whom it may concern:*

Be it known that I, FREDERICK WILLIAM LANCHESTER, engineer, a citizen of Great Britain, and a resident of Cobley Hill, Alvechurch, in the county of Worcester, England, have invented certain new and useful Improvements in Fluid-Pressure Engines, of which the following is a specification.

This invention relates to improvements in motive-power engines, and refers more particularly to that class of motor in which equal quantities of angular momentum are imparted to two oppositely-rotating crank-shafts.

It has for a long time been the practice among steam-engine designers to set out diagrams of torque representing the effective turning moment on the crank-shaft for all angular positions of the pin, and for marine work it has been the practice to get the turning moment as nearly uniform as possible. In engines fitted with fly-wheels it is usual to regard the turning moment as equalized by the inertia of the fly-wheel and less attention is given to the arrangement of cylinders, &c. Single-acting steam-engines and gas-engines are examples. A careful study of the subject, however, shows that although the turning moment may be effectively equalized by means of a fly-wheel so far as the external performance of work is concerned the intermittance of the torque acting between the engine-frame and the crank-shaft is in no way mitigated. In fact, if the frame of the engine be suspended on springs every impulse given to the fly-wheel is accompanied by an effort of the engine-frame to recoil rotationally in the opposite direction, and, in fact, the turning moment acting at any instant through the crank-shaft could be easily measured by the equal and opposite torque acting on the spring-supports.

The first object of the present invention is to avoid this recoil, and my method is by the provision of two oppositely-rotating fly-wheels of equal moment of inertia. When the impulse takes place, equal quantities of angular momentum are received by the two wheels in opposite directions, and there is no unbalanced turning moment acting on the frame. It is worthy of note that reverse rotating shafts in themselves are not sufficient. There must be equality in the moments of inertia. This rotational recoil cannot be got rid of by any of the ordinary balancing arrangements at present resorted to by engineers unless there are two oppositely-rotating parts of equal moment of inertia. The recoil at every point of the cycles is a turning moment equal to that acting on the fly-wheel, but opposite in direction. This is fundamental and is necessitated by first principles.

The second object of the invention is to balance entirely the reciprocation of the pistons and motions of the connecting-rods. This is a problem which in engines of ordinary construction is fairly well understood and is, as a rule, treated as a matter of design. It is usual to arrange the motion of one piston to neutralize more or less that of another or to arrange rotary or reciprocating balance-weights, approximately bringing about the desired result, the effect of the angularity of the connecting-rod being usually ignored and the piston motion assumed to be harmonic. I am the first to point out that two reverse rotating weights may be arranged as the exact equivalent of a harmonically-reciprocating one and also to effect a combination of pistons and connecting-rods whose centers of gravity have an exact harmonic motion and to combine both arrangements to produce an accurately-balanced motive-power engine.

The accompanying drawings illustrate several modifications of my invention.

Figure 1:
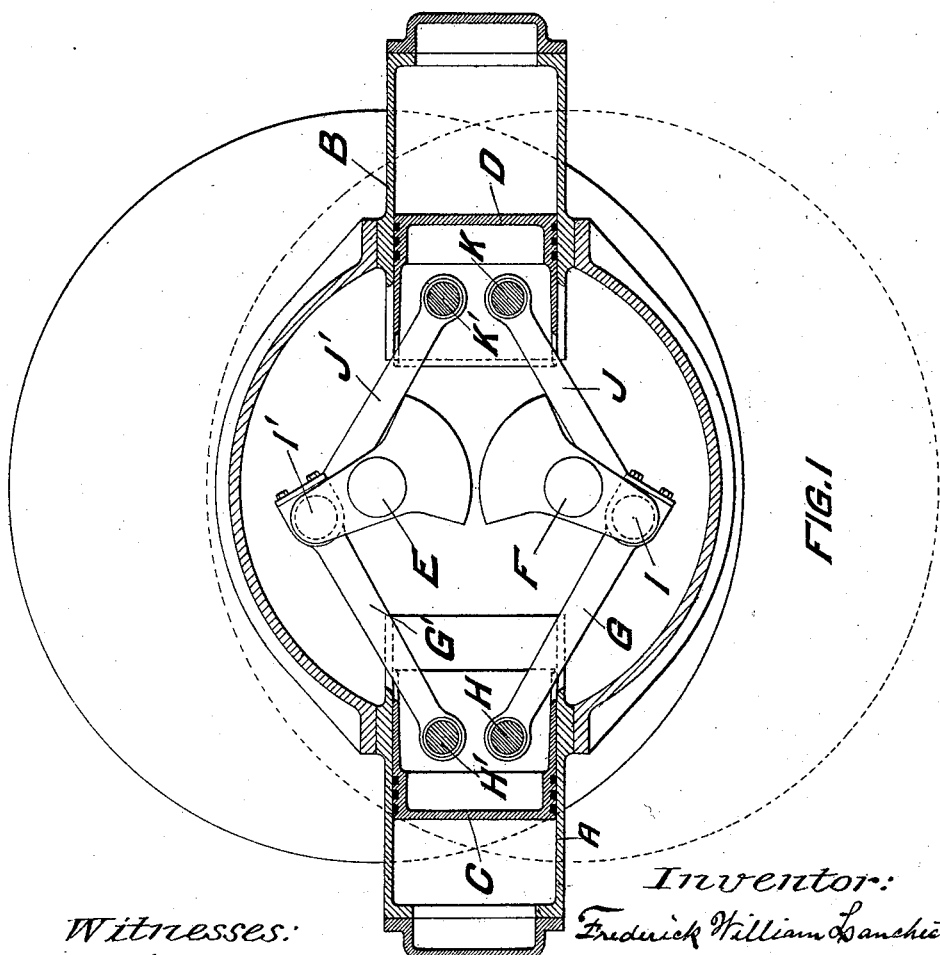
Figure 3:
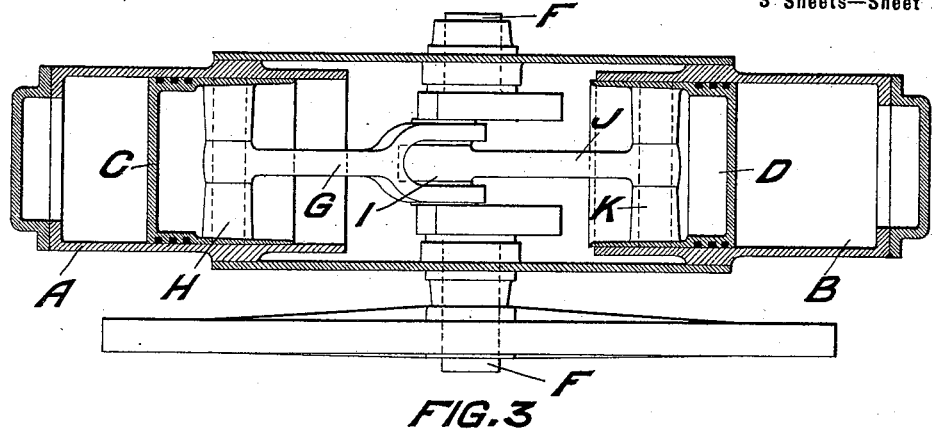
Figure 4:
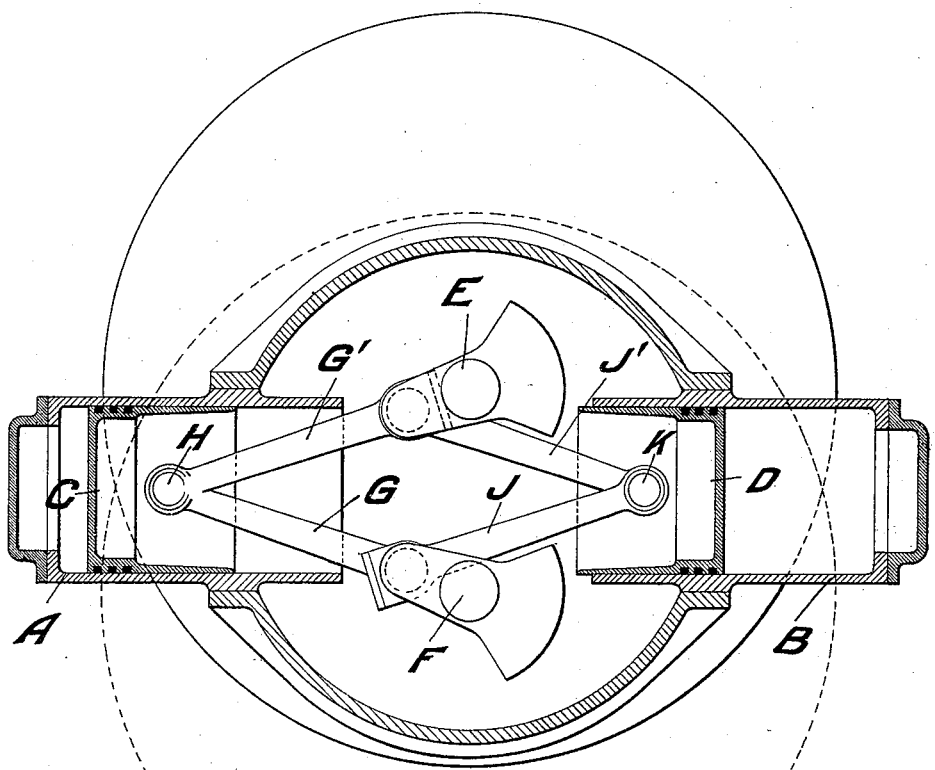
Figure 5:
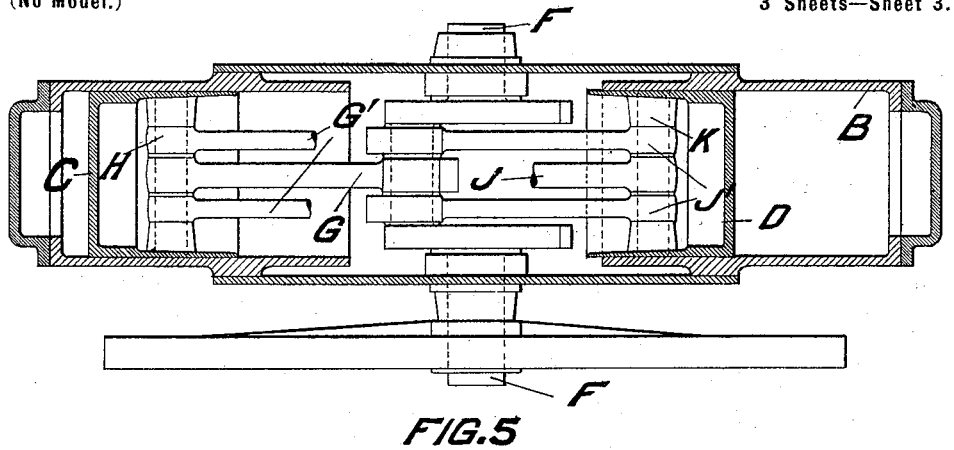

Figures 1, 2, and 3 are respectively sectional elevation and elevation and sectional plan of one method. Figs. 4 and 5 are sectional elevation and sectional plan of another.

Referring now to Figs. 1, 2, and 3 of the drawings, I arrange an engine consisting of two oppositely-placed cylinders A and B, fitted with pistons C and D, preferably of the single-acting-trunk type, driving onto two crank-shafts E and F, arranged to rotate in opposite directions. Each piston is coupled by two connecting-rods, one from either piston driving onto each crank-pin, the said pistons being each fitted with two joint-pins placed side by side. This is clearly shown on Figs. 1 and 3, where the piston C is coupled, by the connecting-rod G, joint-pin H, and crank-pin I, to the crank-shaft F, while the piston D is coupled to the same crank-shaft and crank-pin by its connecting-rod J and joint-pin K. Similarly the same pistons C and D are coupled to the crank-shaft E and crank-pin I by their respective connecting-rods G' and J' and joint-pin H' K'.

Referring to Fig. 1, it will be seen that the joint-pins H H' K K' in the pistons C and D are separate and parallel to one another. It will be seen that in this arrangement both pistons are never on their dead-centers simultaneously and that consequently there is no point at which the two crank-shafts could be started in the same direction or could be made to jam one another. Thus when the engine is running the reciprocating and rotating portions are always balanced and always geared.

The cylinders are fitted with appropriate valve-gear, according to the working fluid used.

Referring now to Figs. 4 and 5, this is a modification in which the oppositely-rotating crank-shafts are placed parallel with one another, as in the previously-described arrangement, but have their piston-joint pins on a common center instead of having two separate pins to each piston. Two cylinders A and B are fitted with pistons C and D, the piston C having a joint-pin H, while the piston D has a joint-pin K, and the connecting-rods G G' couple the piston C to their respective crank-shafts F E, while similarly the connecting-rods J J' couple the piston D to the same crank-shafts. The action of this arrangement is similar to that hereinbefore described.

The balance-weights (shown in all the figures) opposing the crank are proportional to balance the whole of the reciprocating and rotating parts, and it is to be understood that in all modifications the symmetrical arrangement in combination of distributed balance-weights, oppositely-rotating fly-wheels of approximately equal moment of inertia, and symmetrically-disposed connecting-rods constitute the salient features of the present invention, though it is also evident that instead of one of the cylinders being actuated by fluid-pressure a pump or the like would give nearly the same balance of parts without departing from the subject of the present invention.

Having now described my invention, what I claim as new, and desire to secure by Letters Patent, is—

1. In combination in an engine actuated by fluid-pressure, two oppositely-placed coaxial cylinders, a piston reciprocating in each cylinder, two crank-shafts situated midway between the cylinders, a connecting-rod connecting from each piston to the cranks of each crank-shaft, a pair of fly-wheels placed one on each shaft of approximately equal moment of inertia, and a weight carried by each crank-shaft, said weights being so proportioned as to balance the reciprocating and rotating parts, the whole operating to produce opposite rotation of the crank-shafts and a complete balance of the rotating and reciprocating parts, substantially as described.

2. In combination in a fluid-pressure engine, a pair of oppositely-placed coaxial single-acting cylinders, a trunk-piston working in each cylinder, a pair of crank-shafts journaled midway between said cylinders at equal distances above and below the same, fly-wheels of approximately equal moments of inertia placed one upon each crank-shaft, cranks having balance-weights carried by said crank-shafts, upper connecting-rods extending from each piston to one and the same crank on the upper shaft, and the lower connecting-rods extending from each piston to one and the same crank on the lower shaft, substantially as described.

3. In combination, a pair of oppositely-placed coaxial single-acting cylinders, trunk-pistons reciprocating therein, parallel crank-shafts arranged one above the other equidistant between said cylinders, two fly-wheels of equal moments of inertia carried by said crank-shafts, balance-weights carried by said crank-shafts, a pair of joint-pins in each piston placed symmetrically above and below the common axis of the cylinders, a connecting-rod extending from the upper joint-pin of each piston to the crank on the upper crank-shaft, and a similar connecting-rod extending from the lower joint-pin of each piston to the crank on the lower crank-shaft, substantially as described.

In witness whereof I have hereunto set my hand in presence of two witnesses.

FREDERICK WILLIAM LANCHESTER.

Witnesses:
ALBERT EDWARD PARKER,
REDOLPHO JAMES CLEARY.